US011731472B2

United States Patent
Steele, Jr.

(10) Patent No.: US 11,731,472 B2
(45) Date of Patent: *Aug. 22, 2023

(54) QUICK HITCH ATTACHMENT FOR GOOSENECK TRAILERS AND OTHER IMPLEMENTS

(71) Applicant: High Ball Hitch, LLC, Jackson, MO (US)

(72) Inventor: Richard G. Steele, Jr., Jackson, MO (US)

(73) Assignee: HIGH BALL HITCH, LLC, Jackson, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,925

(22) Filed: Jul. 26, 2022

(65) Prior Publication Data

US 2022/0363098 A1 Nov. 17, 2022

Related U.S. Application Data

(62) Division of application No. 16/295,893, filed on Mar. 7, 2019, now Pat. No. 11,427,046.

(60) Provisional application No. 62/639,864, filed on Mar. 7, 2018.

(51) Int. Cl.
*B60D 1/52* (2006.01)
*B60D 1/28* (2006.01)
*B60D 1/06* (2006.01)

(52) U.S. Cl.
CPC .............. *B60D 1/52* (2013.01); *B60D 1/06* (2013.01); *B60D 1/28* (2013.01)

(58) Field of Classification Search
CPC .............. B60D 1/52; B60D 1/06; B60D 1/28
See application file for complete search history.

(56) References Cited

U.S. PATENT DOCUMENTS

| | | | | |
|---|---|---|---|---|
| 4,202,562 | A | * | 5/1980 | Sorenson ............... B60D 1/247 280/415.1 |
| 4,340,240 | A | | 7/1982 | Anderson |
| 5,277,448 | A | | 1/1994 | Colibert |
| 5,984,019 | A | | 11/1999 | Hund |
| 7,125,033 | B2 | | 10/2006 | Forrister |
| 7,275,754 | B2 | | 10/2007 | Scharmuller |
| 7,690,669 | B2 | | 4/2010 | Johnson |
| 7,690,672 | B2 | * | 4/2010 | Scruggs ................... B60D 1/06 280/495 |
| 8,079,611 | B2 | | 12/2011 | Schroeder |
| 10,106,002 | B2 | * | 10/2018 | McAllister ............... B60D 1/06 |
| 10,953,713 | B2 | * | 3/2021 | Belinky ................. B60D 1/485 |

* cited by examiner

*Primary Examiner* — Kevin Hurley
*Assistant Examiner* — Michael R Stabley
(74) *Attorney, Agent, or Firm* — Sandberg Phoenix & von Gontard PC

(57) ABSTRACT

A quick hitch attachment device for coupling the attachment element of a truck bed type system to a quick hitch. The attachment device includes a mounting member tube, a ball hitch assembly and two or more coupling members adapted to mount a mounting member to the quick hitch. The ball hitch assembly includes a stem configured to be slidably received in the tube.

9 Claims, 3 Drawing Sheets

QUICK HITCH ATTACHMENT FOR GOOSENECK TRAILERS AND OTHER IMPLEMENTS

CROSS-REFERENCE TO RELATED APPLICATIONS

This application is a Divisional Application of U.S. application Ser. No. 16/295,893, filed on Mar. 7, 2019, which claims the benefit of U.S. Provisional Application No. 62/639,864, filed on Mar. 7, 2018, both of which are hereby incorporated by reference herein in their entireties.

STATEMENT REGARDING FEDERALLY SPONSORED RESEARCH

Not Applicable.

BACKGROUND OF THE INVENTION

The subject matter herein relates generally to an agricultural implement. More specifically, it relates to a universal attachment that can be fastened to category 2 and 3 quick hitches with, e.g., a 4" square cross member to pull a gooseneck trailer, bumper pull trailers or used to lift and drag heavy items. The invention also relates to methods and devices related thereto.

Category 2 and 3 quick hitches are used with tractors to allow for the rapid and seamless change of agricultural implements on the machine. Often there exists a need to attach an adapter to the quick hitch to pull a gooseneck trailer, a bumper pull trailer or attach a boom pole to lift/pull other large, heavy objects such as feed bunks and downed trees.

Other adapters have been developed in an attempt to remedy this need; however, such adapters are often too large and lie too close to the hitch, which limit the tractor's turning clearance. Additionally, these adapters are often too heavy and have to be taken off the quick hitch when other implements need to be used, and thus, are not readily available to use in the field.

SUMMARY OF THE INVENTION

The quick hitch attachment disclosed hereinafter provides for a receiver-style hitch that is simple, light, strong, and adaptable to all category 2 and 3 style quick hitches that have an approximately 4" square cross member, and can be used to attach a wide variety of agricultural implements in addition to the male portion with the ball provision and pintle hook mounting plate mentioned here. The receiver portion can be permanently affixed to the quick hitch and not interfere with the attachment of agricultural implements such as a "power take-off" ("PTO") driven mowers or plows. A hitch holster can also be included for convenient storage of the male portion when not being used. When stowed in the holster, the male portion doesn't interfere with the attachment of implements to the quick hitch.

Briefly stated, an attachment to category 2 and 3 quick hitches is provided which allows for the pulling of a gooseneck trailer, bumper pull trailer or the lifting and pulling of other heavy items. In the preferred embodiment, the attachment includes a mounting member fastened to the quick hitch using U-bolts and which includes a receiver tube to attach to a ball hitch assembly. The ball hitch assembly includes a gooseneck ball mounting point for pulling a gooseneck trailer, as well as a pintle hook mounting plate to attach a combination pintle hitch for bumper pull ball/lunette ring trailers for the lifting and pulling of various heavy items.

BRIEF DESCRIPTION OF THE DRAWINGS

Corresponding reference numerals indicate corresponding parts throughout the several figures of the drawings.

DESCRIPTION OF THE PREFERRED EMBODIMENT

Figure 1:
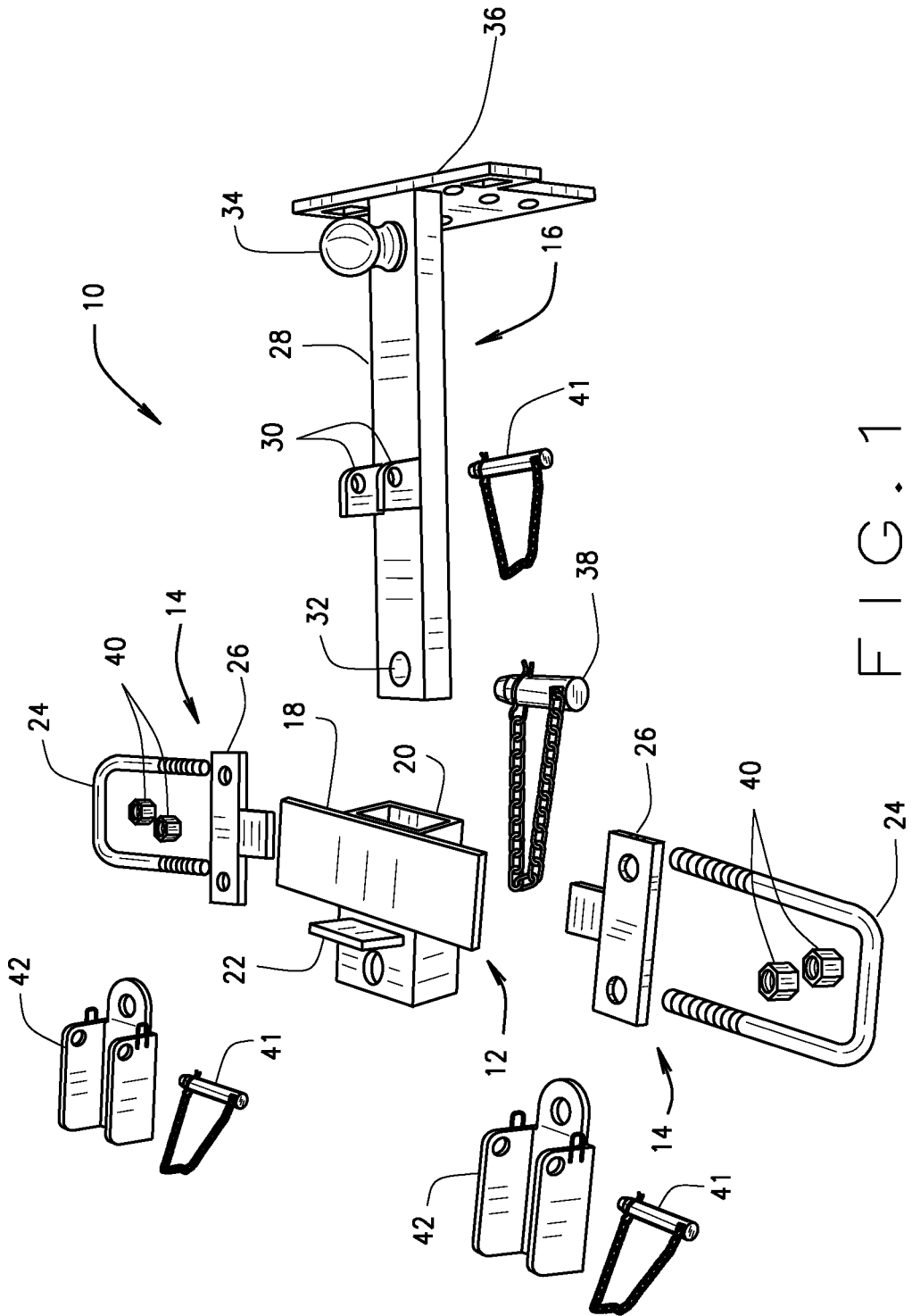
FIG. 1 is an exploded view of all of the parts of an embodiment of the quick hitch attachment apparatus of the invention shown.
Figure 2:
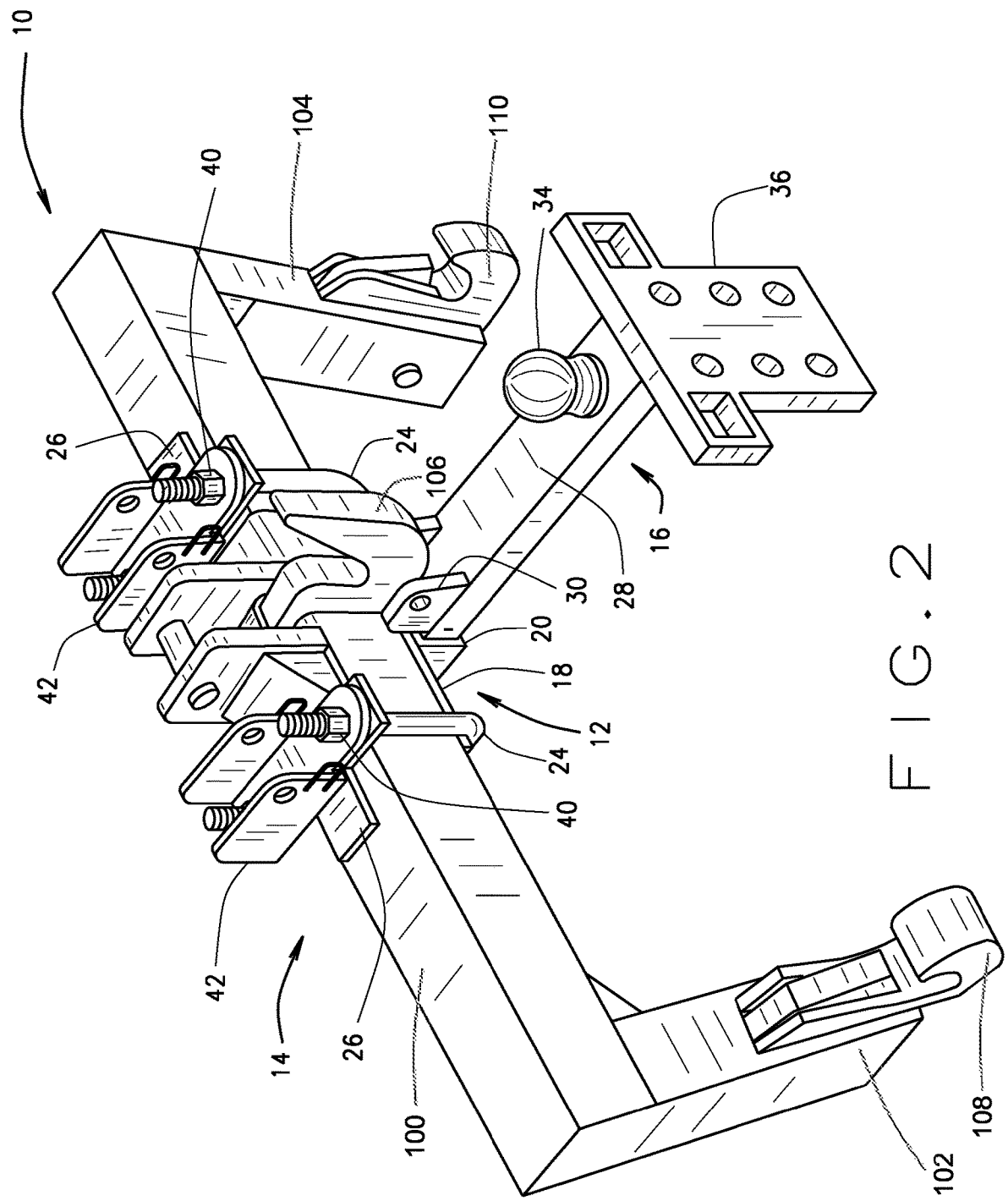
FIG. 2 is a front perspective view of the quick hitch attachment apparatus depicted in FIG. 1.
Figure 3:
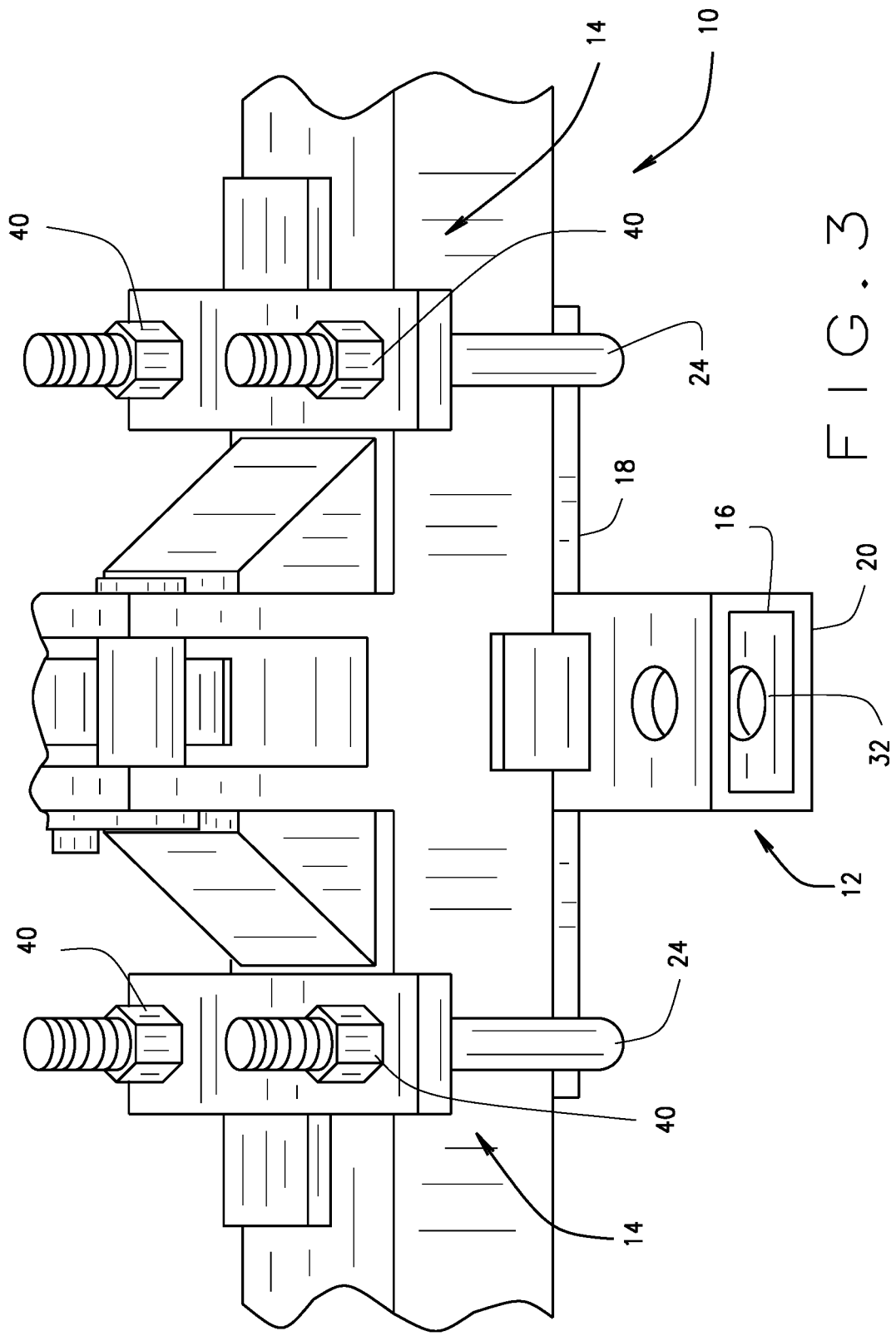
FIG. 3 is the back perspective view of the quick hitch attachment apparatus depicted in FIG. 1.

The following detailed description illustrates the claimed invention by way of example and not by way of limitation. The description clearly enables one skilled in the art to make and use the invention, describes several embodiments, adaptations, variations, alternatives, and uses of the claimed invention, including what is presently believed to be the best mode of carrying out the claimed invention. Additionally, it is to be understood that the claimed invention is not limited in its application to the details of construction and the arrangement of components set forth in the following description or illustrated in the drawings. The claimed invention is capable of other embodiments and of being practiced or being carried out in various ways. Also, it is to be understood that the phraseology and terminology used herein is for the purpose of description As shown in FIGS. 1-3, the quick hitch attachment (10) is a receiver-style hitch designed specifically to be used on agricultural implement quick hitches to pull gooseneck trailers, bumper pull trailers, or to be used as a mini-boom pole for lifting and dragging heavy items. The attachment (10) includes a mounting member (12), ball hitch assembly (16), and coupling member (14).

Standard agricultural implement quick hitches typically include a cross member 100 and left and right side members (102, 104) projecting downwards from the cross-member. The cross-member and side members have mounting parts (106, 108, 110) which permit attachment of implements to the quick hitch, as is known.

Referring to FIGS. 1-3, in an embodiment depicted therein, the mounting member (female portion) (12) attaches directly to the cross-member of the quick hitch. The mounting member (12) includes a plate (18), a reinforcing tab (22), and a receiving tube (20). When mounted to the cross-member, the plate (18) lies directly underneath the cross-member of the quick hitch and, in said embodiment, is roughly the same width as the cross-member so as to provide a strong attachment. The metal reinforcing tab (22) protrudes upwardly from a back edge of the plate (18), to be generally perpendicular to the plate (18). The reinforcing tab (22) assists in holding the quick hitch in place and to distribute pulling force across the center cross-member of quick hitch to take the load off of the U-bolts (24). Directly underneath the plate is a receiving tube (20) that is used to accept attachment from the ball hitch assembly (16). Preferably, the tube (20) extends the width of the plate (18). In this embodiment, a hitch pin (38) is attached to the far end of the receiving tube (20) by means of a cable or chain. The entire mounting member—plate (18), reinforcing tab (22), and receiving tube (20)—are preferably all made from plate steel.

The ball hitch assembly (male portion) (16) can include a stem (28), two reinforcing tabs (30), a gooseneck ball provision (34), and a pintle hook mounting plate with safety chain loops (36). The stem (28) is preferably formed from rectangular bar steel. The stem (28) includes two ends: a receiving end that that is received in the tube (20) of the mounting member (12), and an implement end that includes the gooseneck ball provision (34) that is used to attach a gooseneck trailer or other implements to the quick hitch attachment (10). The receiving end of the stem generally includes a pin hole (32) that accepts the hitch pin (38) of the mounting member (12). The reinforcing tabs (30) preferably lie about halfway in between the receiving end of the stem and the gooseneck ball. The reinforcing tabs (30) extend upwardly from the side edge of a top surface of the stem (28) in a direction that is generally parallel to the stem (28). The tabs (30) are preferably opposite each other and of the same size and dimension. When the stem (28) is received in the mounting member tube (20), the tabs surround the center hook (106) of the quick hitch and help prevent lateral movement of the stem relative to the cross-member (100) as well as preventing over-insertion of the stem (28) and providing additional safety to hitch pin (38) failure. The tabs (30) have a hole for a hitch pin (41) to pass through the center lift hook (106) of the quick hitch to mitigate tongue weight torque and provide added safety and strength to the design. On the end of the implement end of the stem is a pintle hook mounting plate (36) that is pivotable about the stem (28). The pintle hook mounting plate (36) can be used to attach a combination pintle hitch for bumper pull trailers or to lift or drag heavy items. The stem (28) is preferably made of bar steel. The gooseneck ball provision (34) is a 1.25" hole to accommodate preferably a 2-5/16" gooseneck hitch ball with a 1 & 1/4" by 3" shank.

In a depicted embodiment, a pair of coupling members (14) are used to hold the mounting member (12) in place against the cross-member of a quick hitch. Said coupling members include a reversible T-shaped attachment plate (26) to accommodate different quick hitch designs, a U-bolt (24), and two nuts (40) or other fasteners. Along the ends of the T-shaped attachment plate (26) are two or more holes for accepting the U-bolt (24). The short portion of the T-shaped attachment plate (26) lies directly on top of the crossing member. The U-bolt (24) goes underneath one end of the plate (18) of the mounting member and extends upwardly to pass through the holes of the T-shaped attachment member (26). The plate (18) and the cross-member of the quick hitch are held in place by using two nuts (40) or other fasteners. Two or more such coupling members (14) are used. For example, in an embodiment, one such coupling member lies to the left of the hook of the quick hitch, and another on the right side of the hook of the quick hitch. A u-shaped bracket (42) with hitch pin holes is to be affixed atop either T-shaped attachment plate (26) for convenient storage of male portion (28) when not being used. The tabs (30) fit inside the u-shaped bracket (42) and allow the stem (28) to be stored on the tractor side of the quick hitch using pin (41) to secure. Stem is stowed vertically with the main hitch pin hole (32) in the down position and tabs (30) resting in bracket (42) on top of either T-shaped attachment plate (26).

As can be appreciated, an attachment assembly (10) is provided that can quickly and easily mount a ball hitch to the cross-member of a quick hitch. The stem (28) is sized such that when mounted to the quick hitch, it will not interfere with the turning radius of the tractor.

As various changes could be made in the above constructions without departing from the scope of the invention, it is intended that all matter contained in the above description or shown in the accompanying drawing shall be interpreted as illustrative and not in a limiting sense.

What is claimed is:

1. An apparatus for coupling the attaching element of a truck bed system to a quick hitch, said quick hitch having a cross-member, left and right side members, a center lift hook extending from the cross-member, and mounting parts on each left and right side members, the apparatus comprising:
   a mounting member tube;
   two or more coupling members adapted and configured to mount the mounting member tube to a quick hitch; and
   a ball hitch assembly comprising a stem with two reinforcing tabs extending upwardly from the stem, the system adapted and configured to be slidably received in the mounting member tube, and wherein the ball hitch assembly and the mounting member tube are adapted and configured such that the ball hitch assembly is receivable within the receiving tube with the two reinforcing tabs of the ball hitch assembly being positioned with one on either side of the center lift hook of a quick hitch when the apparatus is coupled to a quick hitch.

2. The apparatus of claim 1 wherein the mounting member tube comprises a plate and a reinforcing tab, and wherein the mounting member tube is on a lower surface of the plate.

3. The apparatus of claim 1 wherein the ball hitch assembly comprises:
   the stem having an implement end and an attachment end sized to be received in the mounting member tube; and
   a gooseneck hitch ball provision at the implement end of said stem spaced from said attachment end.

4. The apparatus of claim 3 further comprising a hitch pin receivable by said mounting member at the stem, said stem including a hole at said attachment end through which said pin extends when inserted.

5. The apparatus of claim 4 further comprising:
   a hitch pin receivable by said reinforcing tabs and passing through a center lift hook opening of the quick hitch when inserted.

6. The apparatus of claim 3 further comprising a pintle hook mounting plate with safety chain loops.

7. The apparatus of claim 3 further comprising:
   a pintle hook mounting plate at the far implement end on the lower side of the stem.

8. The apparatus of claim 3 wherein the implement end comprises:
   holes for a hitch pin to pass through engaging the center hook opening of the quick hitch.

9. The apparatus of claim 1 wherein the two or more coupling members each comprise:
   a T-shaped attachment plate;
   a U-bolt; and
   two or more fasteners.

* * * * *